US008450545B2

(12) United States Patent
Dodwell et al.

(10) Patent No.: US 8,450,545 B2
(45) Date of Patent: May 28, 2013

(54) PROCESS FOR CONVERTING AN OXYGENATED FEED TO HIGH OCTANE GASOLINE

(75) Inventors: Glenn W. Dodwell, Bartlesville, OK (US); Joe D. Allison, Bartlesville, OK (US); Shetian Liu, Bartlesville, OK (US); Scott McQueen, Bartlesville, OK (US); Dennis G. Schultz, Bartlesville, OK (US); Byron G. Johnson, Bartlesville, OK (US); Madhu Anand, Bartlesville, OK (US); Melinda L. Johnson, Parsons, KS (US); Larry E. Reed, Bartlesville, OK (US); Brian C. Dunn, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 220 days.

(21) Appl. No.: 12/509,253

(22) Filed: Jul. 24, 2009

(65) Prior Publication Data

US 2010/0041932 A1    Feb. 18, 2010

Related U.S. Application Data

(60) Provisional application No. 61/083,823, filed on Jul. 25, 2008.

(51) Int. Cl.
*C07C 1/20* (2006.01)
(52) U.S. Cl.
USPC ........... 585/357; 585/358; 585/639; 585/640; 502/63; 502/64
(58) Field of Classification Search
USPC ......... 585/408, 469, 733, 357–358, 639–640; 502/66, 63–64
See application file for complete search history.

(56) References Cited

U.S. PATENT DOCUMENTS

| | | | |
|---|---|---|---|
| 4,013,732 A | | 3/1977 | Chang et al. |
| 4,088,706 A | | 5/1978 | Kaeding |
| 4,090,981 A | | 5/1978 | Rodewald |
| 4,097,367 A | | 6/1978 | Haag et al. |
| 4,127,616 A | | 11/1978 | Rodewald |
| 4,465,886 A | | 8/1984 | Rodewald |
| 4,477,583 A | | 10/1984 | Rodewald |
| 4,814,535 A | * | 3/1989 | Yurchak .......... 585/408 |
| 4,950,835 A | | 8/1990 | Wang et al. |
| 5,120,890 A | * | 6/1992 | Sachtler et al. ........... 585/449 |
| 5,516,736 A | * | 5/1996 | Chang et al. ........... 502/64 |
| 6,066,770 A | * | 5/2000 | Wu et al. .......... 585/475 |
| 6,395,949 B1 | | 5/2002 | Drake et al. |
| 6,417,421 B1 | | 7/2002 | Yao |
| 6,777,583 B2 | | 8/2004 | Beck et al. |
| 7,094,941 B2 | | 8/2006 | Das et al. |
| 7,238,636 B2 | | 7/2007 | Beck et al. |
| 2004/0102670 A1 | * | 5/2004 | Beech et al. .......... 585/639 |

FOREIGN PATENT DOCUMENTS

WO    2009/021726 A1    2/2009

* cited by examiner

*Primary Examiner* — Brian McCaig
(74) *Attorney, Agent, or Firm* — Phillips 66 Company

(57) ABSTRACT

A process of modifying a zeolite catalyst to produce a modified zeolite catalyst wherein the modified zeolite catalyst has blocked pore sites. An oxygenated feed is flowed over the modified zeolite catalyst, wherein the oxygenated feed comprises hydrocarbons, methanol and dimethyl ether or a mixture thereof. The hydrocarbons, methanol and dimethyl ether in the oxygenated feed react with the modified zeolite catalyst to produce cyclic hydrocarbons, wherein the cyclic hydrocarbons produced has less than 10% durene and a median carbon number is C8.

9 Claims, 1 Drawing Sheet

Effect of Carbon Conversion on a Modified Zeolite Catalyst on Carbon Number Distribution (Durene Yield = 2.7%)

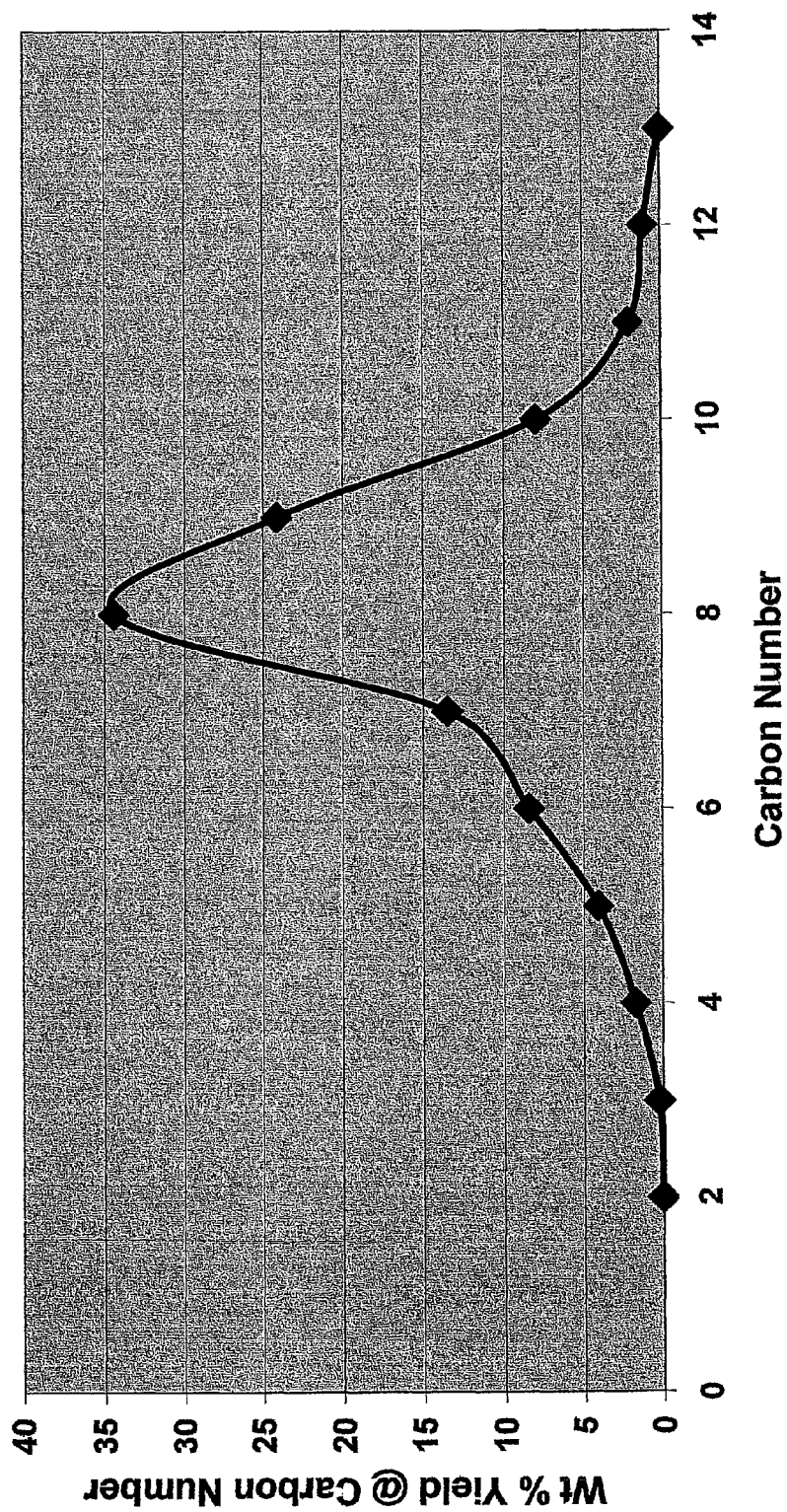

PROCESS FOR CONVERTING AN OXYGENATED FEED TO HIGH OCTANE GASOLINE

CROSS-REFERENCE TO RELATED APPLICATIONS

This application claims benefit of U.S. provisional patent application No. 61/083,823 filed Jul. 25, 2008.

STATEMENT REGARDING FEDERALLY SPONSORED RESEARCH OR DEVELOPMENT

None

FIELD OF THE INVENTION

This invention relates to processes for making liquid fuels from an oxygenated feed and especially to making high octane gasoline with low durene content.

BACKGROUND OF THE INVENTION

With the rising cost of petroleum, alternative sources of gasoline or other liquid fuels will be important to addressing transportation fuel issues in the future. The US has abundant coal resources and many people are considering biomass and other carbon sources for conversion to alternative fuels. Generally, these carbon based materials are converted to synthesis gas or syngas (hydrogen and carbon monoxide) which are synthesized into hydrocarbons. A commonly known process is the Fischer-Tropsch synthesis process practiced by the Germans during World War II. Fischer-Tropsch has numerous limitations including a bias to the production of linear paraffins which have very low octane.

Syngas conversion to methanol and/or dimethyl ether (DME) has been discussed and considered and while there are merits, the essentially non-existent infrastructure and markets are a significant barrier to their adoption as transportation fuels, per se. Creating new ways to make existing fuels, such as gasoline, are the technologies that are most likely to be successful. For example, the conversion of DME to gasoline is known, but has a significant production of isomers of durenes (tetramethyl benzenes). Durene (1,2,4,5 tetramethyl benzene) requires additional processing to isodurene (1,2,3,5 tetramethyl benzene) or less substituted aromatics and may reduce the gasoline yield. Also, DME conversion to gasoline tends to produce gasoline that has excessive amounts of benzene which is carcinogenic and only very small amounts are permitted in saleable gasoline.

U.S. Pat. No. 6,066,770, U.S. Pat. No. 6,395,949 and U.S. Pat. No. 6,417,421 teaches the ability to utilize zeolites to produce hydrocarbons however they do not teach a starting material that has oxygenated feed. These patents utilize low carbon number alkane and aromatic hydrocarbons such as butane, pentane, hexane, benzene, toluene and xylenes to produce gasoline with corresponding low carbon numbers. These patents do not teach to the ability to utilize oxygenated feeds to produce gasoline with low durene levels.

New technologies or improvements to existing technologies are highly desirable for any fuels, and especially transportation fuels.

SUMMARY OF THE INVENTION

In one embodiment the process describes a method of modifying a zeolite catalyst to produce a modified zeolite catalyst wherein the modified zeolite catalyst has blocked pore sites. An oxygenated feed is flowed over the modified zeolite catalyst, wherein the oxygenated feed comprises hydrocarbons, methanol and dimethyl ether or a mixture thereof. The hydrocarbons, methanol and dimethyl ether in the oxygenated feed react with the modified zeolite catalyst to produce cyclic hydrocarbons, wherein the cyclic hydrocarbons produced has less than 10% durene and a median carbon number of C8.

In another embodiment the process describes modifying a ZSM-5 catalyst with either a tetraethyl orthosilicate, a molybdenum or phosphate compound to produce a modified ZSM-5 catalyst wherein the modified ZSM-5 catalyst has blocked pore sites and surface acid sites with protected acid sites and wherein the ZSM-5 catalyst is not calcined prior to the modification. An oxygenated feed flows over the modified zeolite catalyst, wherein the oxygenated feed comprises hydrocarbons, methanol and dimethyl ether and mixtures thereof. The hydrocarbons, methanol and dimethyl ether in the oxygenated feed reacts with the modified zeolite catalyst simultaneously to produce cyclic hydrocarbons, wherein the cyclic hydrocarbons produced has less than 4% durene, less than 0.5% benzene and a median carbon number of $C_8$. The oxygenated feed in this embodiment comes from either coal gasification, natural gas reformation or biomass gasification.

BRIEF DESCRIPTION OF THE DRAWINGS

The invention, together with further advantages thereof, may best be understood by reference to the following description taken in conjunction with the accompanying drawings in which:

FIG. 1 is diagram showing the carbon number shift towards $C_6$ to $C_8$.

DETAILED DESCRIPTION OF THE INVENTION

The present method is a process of converting oxygenated feeds, particularly non-petroleum based feeds, via a catalyst to high octane gasoline with low durene levels.

Oxygenated Feed

Oxygenated feeds can be described as feeds that are not substantially only carbon and hydrogen but also contain an oxygen atom. Typically such feeds come from non-petroleum based areas such as from coal gasification, natural gas reformation or biomass gasification via syngas conversion to the oxygenate. Typical oxygenates consists of alcohols and ethers. The carbon number of the oxygenated feeds range from $C_1$ to $C_6$. When the oxygenates are not isolated prior to conversion to gasoline, the feed stream may also contain unreacted syngas ($H_2$ and CO), $CO_2$, $H_2O$ as well as co-produced light hydrocarbons ($<C_3$).

Catalyst

The catalyst used involves a modified zeolite starting material. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 138-139 (Butterworth-Heineman, Boston, Mass., 3rd ed. 1992). The zeolite starting material used in the composition of can be any zeolite that has a constraint index (as defined in U.S. Pat. No. 4,097,367, which is incorporated herein by reference) in the range of from about 0.4 to about 12, preferably from or about 2 to about 9. Generally, the molar ratio of $SiO_2$ to $Al_2O_3$ in the crystalline framework of the zeolite is at least about 5:1 and can range up to infinity. Preferably, the molar ratio of $SiO_2$ to Al$_2$O$_3$ in the zeolite framework is in the range from about 8:1 to about 200:1, more preferably from about 12:1 to about 100:1. Preferred zeolites include ZSM-5, ZSM-8, ZSM-11, ZSM-12, ZSM-35, ZSM-38, and mixtures thereof. Presently the preferred zeolite is ZSM-5.

It is important to note that it is preferred that in order to make the catalyst the modified zeolite material is not calcined prior to modification.

The modifier selectively deposits a blocking agent on the zeolite using any suitable method known in the art. The blocking agent may be in the form of a solution, an emulsion, a liquid or a gas under the conditions of contact with the zeolite. Examples of methods of depositing a blocking agent on a zeolite are found in U.S. Pat. Nos. 4,090,981, 4,127,616, 4,465,886 and 4,477,583 to Rodewald, which are incorporated by reference herein. Further examples of a silicone deposition on zeolite surfaces are described in U.S. Pat. No. 4,950,835 to Wang et al. A preferred method of depositing the blocking agent on the zeolite is to soak the zeolite in a blocking agent solution containing a blocking agent dissolved in a carrier, then allowing the system to dry by evaporation.

Compounds capable of being utilized as a blocking agent include Group IA, Group IIA, Group IIIA, Group IVA, Group VA, Group IIB, Group IIIB, Group IVB, Group VIB, of the Periodic Table of the Elements, and combinations of two or more thereof. Illustrated herein below are some examples of suitable blocking agents Any Group IIB metals or compounds which can, when incorporated into a zeolite, enhance a hydrocarbon conversion reaction can be used in the present invention. Examples of suitable Group IIB metals or compounds include, but are not limited to, zinc, zinc oxide, zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc nitrate, zinc sulfate, zinc halides, zinc phosphate, zinc acetate dihydrate, diethylzinc, zinc 2-ethylhexanoate, titanium zinc titanate, and combinations of two or more thereof.

Examples of suitable Group IVB metals or compounds include, but are not limited to, titanium, zirconium, hafnium, lanthanum, cerium, lanthanum titanate, titanium tetramides, titanium tetramercaptides, titanium chloride, titanium oxalate, zinc titanate, tetraisopropyl titanate, tetra-n-butyl titanate, tetrakis(2-ethylhexyl) titanate, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, titanium tetraphenoxide, and combinations of two or more thereof.

Examples of suitable Group IIA metals or compounds include, but are not limited to, magnesium, magnesium oxide, magnesium silicate, magnesium nitrate, magnesium acetate, magnesium acetylacetoante, magnesium chloride, magnesium molybdate, magnesium hydroxide, magnesium sulfate, magnesium sulfide, magnesium titanate, magnesium tungstate, magnesium formate, magnesium bromide, magnesium bromide diethyl etherate, magnesium fluoride, dibutyl magnesium, magnesium methoxide, Mg(OC$_2$H$_5$)$_2$, Mg(OSO$_2$CF$_3$)$_2$, dipropyl magnesium, and combinations of two or more thereof.

Examples of Group IVA metals or compounds include, but are not limited to, silicon, silicon oxide, poly(phenylmethylsiloxane), poly(phenylethylsiloxane), poly(phenylpropylsiloxane), hexamethyldisiloxane, decamethyltetrasiloxane, diphenyltetramethyldisiloxane, tetraethyl orthosilicate, trimethylchlorosilane, chloromethyldimethylchlorosilane, N-trimethylsilylimidazole, N,O-bis(trimethylsilyl)acetamide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, (3-(2-aminoethyl)aminopropyl) trimethoxysilane, cyanoethyltrimethoxysilane, aminopropyltriethoxysilane, phenyltrimethoxysilane, (3-chloropropyl)trimethoxysilane, (3-mercaptopropyl)trimethoxysilane, (3-glycidoxypropyl) trimethoxysilane, vinyltris(β-methoxyethoxy)silane, (γ-methacryloxypropyl)trimethoxysilane, vinylbenzyl cationic silane, (4 aminopropyl)triethoxysilane, (γ-(β-aminoethylamino)propyl) trimethoxysilane, (γ-glycidoxypropyl)trimethoxysilane, (β-(3,4-epoxycyclohexyl)ethyl) trimethoxysilane, (β-mercaptoethyl)trimethoxysilane, (γ-chloropropyl)trimethoxysilane, and combinations of any two or more thereof can also be employed.

Similarly, any Group VA metals or compounds that, when impregnated onto or incorporated into a zeolite are capable of enhancing oxygenated feed conversion can be used in the present invention. Examples of suitable Group VA metals or compounds include, but are not limited to, phosphorus, phosphorus oxide, phosphorus pentoxide, phosphorus oxychloride, phosphoric acid, P(R)$_3$, P(OR)$_3$, P(O)(OR)$_3$, trimethyl phosphate, triethyl phosphate, and tripropyl phosphate, P(O) (R)$_3$, phosphines P(R)$_3$, and combinations of any two or more thereof wherein each R can be the same or different and is independently selected from the group consisting of hydrogen, alkyl radicals, alkenyl radicals, aryl radicals, alkaryl radicals, aralkyl radicals, and combinations of any two or more thereof.

Suitable Group VIB metals or compounds include, but are not limited to, molybdenum compounds, molybdenum chloride, molybdenum acetate, molybdenum fluoride, molybdenum oxychloride, molybdenum sulfide, ammonium heptamolybdate and combinations of two or more thereof.

Examples of suitable Group IIIB metals or compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, lanthanum titanate, and combinations of any two or more thereof.

In one embodiment it is possible for the modified zeolite to be modified with a group IVA, VIB or VA compound. In another embodiment it is possible for the modified zeolite to be modified with any combination of compounds listed above. In yet another embodiment the zeolite can be modified with either a tetraethyl orthosilicate, a molybdenum or a phosphate compound.

Optionally a zeolite can be steam—and/or acid—treated before using the present invention.

A zeolite, whether it has been steamed or not, can be treated with an acid before the preparation of the present composition. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to sulfuric acid, hydrochloric acid, nitric acid, phosphoric acid, formic acid, acetic acid, oxalic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of any two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations thereof.

Any methods known to one skilled in the art for treating a solid catalyst with an acid can be used in the acid treatment of the present invention. Generally, a zeolite, whether or not it contains a binder, or has been steamed, can be suspended in an acid solution. The concentration of the zeolite in the acid solution can be in the range of from about 0.01 to about 700, preferably about 0.1 to about 600, more preferably about 1 to about 550, and most preferably 5 to 500 grams per liter. The amount of acid required is the amount that can maintain the solution in acidic pH during the treatment. Preferably the initial pH of the acid solution containing a zeolite is adjusted to lower than about 7, preferably lower than about 6. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as that disclosed above. The mild acid treatment can also be carried out under substantially the same conditions disclosed in the acid treatment disclosed above. Thereafter, the resulting solid can be washed and dried as disclosed above.

It should be noted that, a zeolite can be acid-leached before it is treated with steam.

Accordingly in one embodiment the surface acid sites of the modified zeolite have been blocked while the acid sites within the pores have been protected to remain active.

The dried, acid-leached zeolite, whether it has been further washed with a mild acid or not, can be either heated with steam or calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 1 to about 20 hours, and most preferably 2 to 15 hours.

One of the key elements of the process involves the specific role the modified zeolite catalyst imparts onto the oxygenated feed. The surface acid sites of the catalyst have been modified while the acid sites within the pores have been protected to remain active. It is at the surface sites where the durenes are believe to be created in prior conversion to gasoline efforts, and the modification of these sites that reduce the durene make to acceptably small amounts.

The process for modifying the zeolite includes the delivery of an acidity modifier to the catalyst. Phosphorus in the form of phosphoric acid is preferred, but zinc and gallium have shown to provide good results. The modifier is provided to the zeolite preferably by incipient wetness impregnation. In the case of phosphorous, the phosphoric acid hydrolyzes the framework alumina of the zeolite and removes the framework alumina from the structure forming inert aluminum phosphate. These deactivated surface sites are believed to cause the reduction or elimination of several challenges for DME to gasoline reaction systems. It is believed that durenes would otherwise be formed at the surface sites and as a result of the active sites being in the pores, large molecules like durenes are unlikely to be formed. Secondly, as olefins are formed by the Dimethyl ether To Gasoline (DTG) catalyst, closely adjacent surface sites are believed to cause the transfer of hydride ions ($H^-$) and saturate the olefins to normal paraffins. A first step to reduce hydride transfer is to start with a higher silica/$Al_2O_3$ ratio zeolite catalyst. As olefins are generally high octane molecules and normal paraffins are low octane molecules, hydride ion transfer is preferably avoided. Again, modifying the surface acid sites is believed to have increased the productivity of olefins and reduced the productivity of normal paraffins. An additional benefit of the modification surface acid sites is that the catalytic rate is slowed for making aromatics and the desired products can be withdrawn from the reactor and specifically the catalyst at a point where the desired products are present and before the fully complete reactions would produce excess aromatics. A fourth advantage of the catalyst structure resulting from the phosphoric modification is that the benzene make is reduced. At lower pressures, typically only tenths of a percent of benzene are produced.

Gasoline Product

After modification, it is speculated that the modified zeolite utilized in the reaction has the blocking agent blocking Bronsted and Lewis acid sites to produce selective catalyst of $C_{10}$ or lower aromatics. Furthermore it is speculated that the blocking of the pore sites in the zeolite prevent molecules larger than para-xylene from diffusing out of the pores, molecules such as ortho-xylene or meta-xylene.

Most importantly, the present method reduces the occurrence of durene that typically occurs from catalytic conversion of oxygenated feeds. Durene (1,2,4,5 tetramethyl benzene) is typically eliminated from product of the oxygenated feeds to gasoline conversion via a hydro-isomerization procedure to convert it to isodurene (1,2,3,5 tetramethyl benzene). Durene is an undesirable component of gasoline because it has a high melting point and its tendency to crystallize out of solution at temperatures below 175° F. (its melting point) it may crystallize out of the gasoline in unheated transfer lines or in storage tanks. Isodurene (1,2,3,5 tetramethyl benzene) has a melting point of −11° F. and does not precipitate from the gasoline solution.

Typical oxygenated feed to gasoline conversion yields between 10 to 30% durene.

By using the modified zeolite of the present method it is possible to produce gasoline with a durene yield below 10%, most often below 4%, but durene levels of 3.5%, 3%, 2.5%, 2%, 1.5%, 1% are possible 0.5% are possible. As shown in FIG. 1, use of a modified zeolite was able to shift the carbon number distribution closer towards $C_6$ to $C_8$ with a dramatic reduction of $C_{10}$ durene. The benefit of doing so increases the octane number of the gasoline.

Furthermore the amount of benzene present in the cyclic hydrocarbons can be produced less than 3% even less than 2.5%, 2%, 1.5%, 1%, 0.05% or even 0.01%.

Reaction of Oxygenated Feed and Catalyst

In this method there are three main reactions, that can occur simultaneously, to produce the high octane gasoline.

(1) Methanol in the oxygenated feed is converted to high octane liquid gasoline over a modified ZSM-5 catalyst;

(2) Dimethyl ether in the oxygenated feed is converted to high octane liquid gasoline over a modified ZSM-5 catalyst;

and (3) Trace hydrocarbons in the oxygenated feed are converted to high octane liquid gasoline over a modified ZSM-5 catalyst.

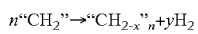

EXAMPLES

To further illustrate various embodiments of the present invention, the following examples are provided.

Example 1

A ZSM-5 zeolite catalyst was obtained from Sud Chemie (T-4480) and was modified by incipient wetness impregnation with a 30% phosphoric solution and calcined for 4 hours at 500° C. The modified catalyst was placed in a fixed bed reactor installed in a three zone electrically heated furnace and DME was delivered at 350 C. and 15 psig at a rate of 9.9 grams per gram of catalyst per hour. Liquid DME gas is supplied to the reactor system using an ISCO HPLC pump where the pump's piston pushes the liquid DME through a back pressure regulator and into reactor system. Online product sampling analyzes the entire hydrocarbon product distribution from methane on out to $C_{15}$ or more using a running on a Wasson Analytical modified Agilent 6890 GC. Following this gas chromatograph, the condensable hydrocarbons are trapped by a condenser which is operated at −3° C. Following the condenser, the non permanent gasses and light hydrocarbons are analyzed by a refinery gas analyzer. The condensed hydrocarbons are then analyzed again by off line detailed hydrocarbon analysis (DHA) The results obtained are indicated in Table A below.

TABLE A

| Example No. | Pressure PSIG | % Benzene Content | Space Velocity g feed per g catalyst per hour | DME Conv | Ron | Mon |
|---|---|---|---|---|---|---|
| 1 | 15 | 0.087 | 9.9727 | 91.69% | 90.56 | 79.27 |
| 2 | 15 | 0.052 | 9.9727 | 43.36% | 90.39 | 78.48 |
| 3 | 15 | 0.123 | 9.9727 | 98.95% | 94.51 | 81.83 |
| 4 | 15 | 0.102 | 5.0169 | 93.40% | 93.49 | 81.15 |
| 5 | 15 | 0.103 | 9.9727 | 99.56% | 90.86 | 79.61 |
| 6 | 0 | 0.312 | 9.9727 | 95.55% | 98.92 | 87.38 |
| 7 | 0 | 0.062 | 9.9727 | 57.25% | 87.57 | 77.22 |
| 8 | 0 | 0.051 | 9.9727 | 57.23% | 88 | 77.49 |
| 9 | 0 | 0.106 | 19.9453 | 71% | 90.08 | 78.1 |
| 10 | 0 | 0.144 | 9.9727 | 75.85% | 91.66 | 80.19 |
| 11 | 0 | 0.242 | 4.9863 | 100% | 94.61 | 82.01 |
| 12 | 0 | 0.199 | 9.9727 | 100% | 93.13 | 81 |
| 13 | 0 | 0.168 | 9.9727 | 94.14% | 92.99 | 80.8 |
| 14 | 15 | 0.192 | 6.9809 | 89.88% | 93.83 | 81.75 |
| 15 | 15 | 0.221 | 9.9727 | 66.94% | 93.35 | 81.66 |
| 16 | 15 | 0.138 | 9.9727 | 95.67% | 92.45 | 80.89 |

TABLE A-continued

| Example No. | Pressure PSIG | % Benzene Content | Space Velocity g feed per g catalyst per hour | DME Conv | Ron | Mon |
|---|---|---|---|---|---|---|
| 17 | 15 | 0.051 | 9.9727 | 9.15% | 97.58 | 87.37 |
| 18 | 15 | 0.153 | 9.9727 | 93.76% | 93.55 | 81.87 |
| 19 | 15 | 0.454 | 9.9727 | 81.48% | 102.32 | 89.63 |
| 20 | 15 | 0.007 | 9.9727 | 100% | 96.15 | 83.23 |
| 21 | 100 | 0.169 | 19.9453 | 84.26% | 92.87 | 83.86 |
| 22 | 100 | 0.25 | 69.8086 | 79.09% | 89.82 | 82.38 |
| 23 | 100 | 0.121 | 34.9043 | 72.77% | 91.71 | 83.19 |
| 24 | 100 | 0.182 | 19.9453 | 80.58% | 93.22 | 84.4 |
| 25 | 100 | 0.161 | 19.9453 | 82.75% | 92.26 | 83.43 |
| 26 | 100 | 0.633 | 9.9727 | 92.92% | 100.04 | 89.56 |
| 27 | 100 | 0.686 | 4.9863 | 97.02% | 102.22 | 89.91 |
| 28 | 100 | 0.338 | 9.9727 | 99.56% | 97.26 | 87.16 |
| 29 | 100 | 0.33 | 9.9727 | 98.78% | 98.03 | 88.03 |
| 30 | 100 | 0.883 | 9.9727 | 99.55% | 104.77 | 92.75 |
| 31 | 100 | 0.425 | 9.9727 | 97.56% | 101.8 | 90.83 |
| 32 | 100 | 0.69 | 9.9727 | 99.88% | 105.1 | 92.99 |
| 33 | 100 | 0.151 | 9.9727 | 75.37% | 93.08 | 83.62 |
| 34 | 100 | 2.463 | 9.9727 | 100% | 114.78 | 97.11 |
| 35 | 100 | 1.74 | 9.9727 | 99.38% | 112.03 | 95.02 |
| 36 | 100 | 0.422 | 9.9727 | 98.60% | 101.60 | 92.03 |
| 37 | 100 | 0.937 | 9.9727 | 94.46% | 106.98 | 94.3 |
| 38 | 100 | 2.149 | 9.9727 | 99.23% | 112.29 | 96.12 |
| 39 | 100 | 0.276 | 99.7265 | 15.09% | 107.36 | 93.13 |
| 40 | 100 | 1.285 | 9.9727 | 85.21% | 107.73 | 92.96 |
| 41 | 100 | 1.442 | 4.0992 | 76.45% | 112 | 95.65 |
| 42 | 100 | 3.117 | 8.1984 | 3.85% | 109.71 | 94.78 |
| 43 | 50 | 0.124 | 9.9727 | 99.77% | 92.7 | 82.16 |
| 44 | 100 | 0.154 | 9.9727 | 100% | 93.63 | 83.81 |
| 45 | 150 | 0.155 | 9.9727 | 100% | 92.54 | 84.04 |
| 46 | 200 | 0.184 | 9.9727 | 100% | 94.45 | 85.94 |
| 47 | 250 | 0.152 | 9.9727 | 100% | 94.25 | 86.53 |

As can be seen in Table A, high octane numbers are quite practical when considering the Research Octane Number (RON) and Motor Octane Number (MON) for the products. As such, it may be attractive to produce octane enhancer and blendstock for delivery to a refinery.

Example 2

98 grams of ZSM-5 were impregnated with 27.73824 grams of tetraethylorthosilicate, dried in a drying oven at 120° C. and calcined for 4 hours at 500° C. 7.2 grams of the resulting catalyst was mixed with 70 grams of inert alundum and placed in the reactor system described previously. Dimethyl ether was passed over this catalyst at a rate of 1.63 liquid cc's per minute along with 250 cc/min nitrogen gas at 15 psig and 350° C. inlet temperature. The product went to a condenser held at −3° C. where the $C_{5+}$ hydrocarbons were condensed out. The remaining gas was analyzed using a gas chromatograph gas analyzer.

The condensed liquid product had an aqueous phase and a hydrocarbon liquid phase floating on top of the aqueous phase. The hydrocarbon phase was submitted for detailed hydrocarbon analysis.

A carbon number distribution was also done on the sample and the following results were obtained as shown in Table C below:

TABLE C

| C# | % Weight | % Volume |
|---|---|---|
| $C_2$ | 0.003 | 0.006 |
| $C_3$ | 0.224 | 0.362 |
| $C_4$ | 1.689 | 2.388 |

TABLE C-continued

| C# | % Weight | % Volume |
|---|---|---|
| $C_5$ | 4.067 | 5.205 |
| $C_6$ | 8.444 | 9.920 |
| $C_7$ | 13.508 | 13.728 |
| $C_8$ | 34.415 | 32.881 |
| $C_9$ | 24.147 | 22.984 |
| $C_{10}$ | 7.971 | 7.380 |
| $C_{11}$ | 2.079 | 1.816 |
| $C_{12}$ | 1.110 | 0.994 |
| $C_{13}$ | 06062 | 0.063 |
| $C_{15}$ | 0.782 | 0.828 |

A test was run and it was determined that the amount of durene present in the sample was 2.663 wt %. This is a significant improvement versus the test run with unmodified zeolites. When the test was run with unmodified zeolites the amount of durene present in the sample was as high at 15 wt %.

Example 3

Mo/ZSM-5 catalysts with Mo loading ranging from 0.01% to 20% were prepared by incipient wetness impregnation of $NH_4ZSM$-5, HZSM-5 or alumina- or silica-bonded ZSM-5 having a $SiO_2/Al_2O_3$ between 20 to 800 with an aqueous solution of $(NH_4)_6Mo_7O_{24} \cdot 4H_2O$ (AHM). The impregnated samples were dried at 383K and finally calcined at 573K to 1073K for several hours. Catalytic reaction for methanol/dimethylether conversion to gasoline was carried out in a fixed-bed continuous-flow reactor at 573K to 773K temperature and 0 Psig to 1000 Psig pressure. The methanol weight hourly space velocity was varied from 0.1 hr-1 to 10.0 $hr^{-1}$.

Sample 1:
A commercial catalyst T4480 (HZSM-5 with 30 wt. % $Al_2O_3$ binder) was used for methanol conversion at 300° C. and 350 psig at a methanol weight hourly space velocity ($W_{MeOH}$HSV) OF 4.5H-1 using nitrogen (200 Ml/min) as carrier gas. The obtained gasoline has a durene concentration of 20.5%.

Sample 2:
0.75 g AHM was dissolved in 20 mL deionized water, and then 20 g of $NH_4ZSM$-5 ($SiO_2/Al_2O_3$=50) was put into this solution. After thoroughly mixing and wetting, the impregnated sample was dried at 110° C. in air atmosphere for 24 hours, and then calcined in air at 500° C. for 3 hours.

The above calcined catalyst was pelletized into 0.2-0.5 mm particles and subject to methanol conversion reaction at 450° C. and 350 psig with a $W_{MeOH}$HSV of 4.5 $h^{-1}$ using nitrogen (200 mL/min) as carrier gas. The obtained gasoline has a durene concentration of 1.8%.

Sample 3:
2.35 g AHM was dissolved in 20 mL dionized water, and then 20 g of $NH_4ZSM$-5 ($SiO_2/Al_2O_3$=50) was put into this solution. After thoroughly mixing and wetting, the impregnated sample was dried at 110° C. in air atmosphere for 24 hours, and then calcined in air at 500° C. for 3 hours.

The above calcined catalyst was pelletized into 0.2-0.5 mm particles and subject to methanol conversion reaction at 450° C. and 350 psig with a $W_{MeOH}$HSV of 4.5 $h^{-1}$ using nitrogen (200 mL/min) as carrier gas. The obtained gasoline has a durene concentration of 1.9%.

Sample 4:
The calcined catalyst of sample 3 was subject to dimethylether conversion reaction at 400° C. and 350 psig with a $W_{DME}$HSV of 7.6 $h^{-1}$ using nitrogen (200 mL/min) as carrier gas. The obtained gasoline has a durene concentration of 1.1%.

Sample 5:
0.92 g AHM was dissolved in 33 mL deionized water, and then 50.0 g of T4480 was put into this solution. After thoroughly mixing and wetting, the impregnated sample was dried at 110° C. in air atmosphere for 24 hours, and then calcined in air at 500° C. for 3 hours.

The above calcined catalyst was subject to methanol conversion reaction at 350° C. and 350 psig with a $W_{MeOH}$HSV of 4.5 $h^{-1}$ using nitrogen (200 mL/min) as carrier gas. The obtained gasoline has a durene concentration of 15.0%.

Sample 6:
5.87 g AHM was dissolved in 33 mL deionized water, and then 50.0 g of T4480 was put into this solution. After thoroughly mixing and wetting, the impregnated sample was dried at 110° C. in air atmosphere for 24 hours, and then calcined in air at 500° C. for 3 hours.

The above calcined catalyst was subject to methanol conversion reaction at 350° C. and 350 psig with a $W_{MeOH}$HSV of 4.5 $h^{-1}$ using nitrogen (200 mL/min) as carrier gas. The obtained gasoline has a durene concentration of 13.3%.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of any reference is not an admission that it is prior art to the present invention, especially any reference that may have a publication date after the priority date of this application.

The invention claimed is:

1. A process of:
   (a) modifying a zeolite catalyst with a tetraethyl orthosilicate compound with steam treatment and acid treatment to produce a modified zeolite catalyst wherein the modified zeolite catalyst has blocked pore sites;
   (b) flowing an oxygenated feed over the modified zeolite catalyst, wherein the oxygenated feed comprises hydrocarbons, methanol and dimethyl ether or a mixture thereof; and
   (c) reacting the hydrocarbons, methanol and dimethyl ether in the oxygenated feed with the modified zeolite catalyst to produce cyclic hydrocarbons, wherein the cyclic hydrocarbons produced has less than 10% durene, less than 3% benzene, and a median carbon number is $C_8$ wherein the acid treatment consists of: sulfuric acid, hydrocholoric acid, phosphoric acid, formic acid, acetic acid, oxalic acid trifluoroacetic acid, trichloroacetic acid, p-toluene-sulfonic acid, methanesulfonic acid and combinations thereof.

2. The process of claim 1, wherein the zeolite catalyst is ZSM-5.

3. The process of claim 1, wherein the surface acid sites of the modified zeolite have been blocked while the acid sites within the pores have been protected to remain active.

4. The process of claim 1, wherein the oxygenated feed comes from either coal gasification, natural gas reformation or biomass gasification.

5. The process of claim 1, wherein the amount of durene produced is less than 4%.

6. The process of claim 1, wherein the amount of benzene in the cyclic hydrocarbons is less than 0.5%.

7. The process of claim 1, wherein the reactions of hydrocarbons, methanol and dimethyl ether with the modified zeolite catalyst all occur simultaneously.

8. The process of claim 1, wherein the zeolite catalyst is not calcined prior to the modification.

9. A process of:
(a) modifying a ZSM-5 catalyst with a tetraethyl orthosilicate compound with steam treatment and acid treatment to produce a modified ZSM-5 catalyst wherein the modified ZSM-5 catalyst has blocked pore sites and surface acid sites with protected acid sites and wherein the ZSM-5 catalyst is not calcined prior to the modification;
(b) flowing an oxygenated feed over the modified zeolite catalyst, wherein the oxygenated feed comprises hydrocarbons, methanol and dimethyl ether and mixtures thereof;
(c) reacting the hydrocarbons, methanol and dimethyl ether in the oxygenated feed with the modified zeolite catalyst simultaneously to produce cyclic hydrocarbons, wherein the cyclic hydrocarbons produced has less than 4% durene, less than 0.01% benzene and a median carbon number is $C_8$;
and wherein the oxygenated feed comes from either coal gasification, natural gas reformation or biomass gasification and
wherein the acid treatment consists of: sulfuric acid, hydrocholoric acid, phosphoric acid, formic acid, acetic acid, oxalic acid trifluoroacetic acid, trichloroacetic acid, p-toluene-sulfonic acid, methanesulfonic acid and combinations thereof.

* * * * *